United States Patent
Pilgram et al.

(10) Patent No.: US 7,386,059 B2
(45) Date of Patent: Jun. 10, 2008

(54) DEVICE FOR PROCESSING SIGNALS IN A MOBILE STATION

(75) Inventors: Berndt Pilgram, München (DE); Dietmar Wenzel, München (DE)

(73) Assignee: Infineon Technologies AG, Neubiberg (DE)

(*) Notice: Subject to any disclaimer, the term of this patent is extended or adjusted under 35 U.S.C. 154(b) by 366 days.

(21) Appl. No.: 11/180,148

(22) Filed: Jul. 13, 2005

(65) Prior Publication Data

US 2006/0013324 A1    Jan. 19, 2006

Related U.S. Application Data

(63) Continuation of application No. PCT/DE04/00041, filed on Jan. 15, 2004.

(30) Foreign Application Priority Data

Jan. 15, 2003    (DE)    ................... 103 01 303

(51) Int. Cl.
- H04L 27/00    (2006.01)
- H04L 5/16    (2006.01)
- H04B 1/38    (2006.01)
- H04B 1/034    (2006.01)

(52) U.S. Cl. ............ 375/295; 375/219; 375/259; 455/73; 455/100; 455/561

(58) Field of Classification Search ........ 375/259, 375/340, 316, 219, 295; 455/39, 40, 502, 455/422, 561, 73, 83, 91
See application file for complete search history.

(56) References Cited

U.S. PATENT DOCUMENTS

| | | | |
|---|---|---|---|
| 5,396,653 A * | 3/1995 | Kivari et al. ............ | 455/88 |
| 5,564,076 A | 10/1996 | Auvray | |
| 5,867,535 A | 2/1999 | Phillips et al. | |
| 6,708,044 B1 * | 3/2004 | Puknat et al. ............ | 455/552.1 |
| 7,024,225 B2 * | 4/2006 | Ito ........................ | 455/558 |
| 7,142,557 B2 * | 11/2006 | Dhir et al. ............. | 370/463 |
| 7,149,473 B1 * | 12/2006 | Lindlar et al. .......... | 455/41.1 |
| 7,151,745 B2 * | 12/2006 | Lin et al. ............... | 370/230 |

(Continued)

FOREIGN PATENT DOCUMENTS

DE    100 35 116 A1    1/2002

(Continued)

OTHER PUBLICATIONS

"W7020 Bluetooth Radio Module", Lucent Technologies, Bell Labs Innovations, XP-002207699, Dec. 1999, 2 pgs.

(Continued)

Primary Examiner—Mohammed Ghayour
Assistant Examiner—Sophia Vlahos
(74) Attorney, Agent, or Firm—Eschweiler & Associates, LLC

(57) ABSTRACT

A device for processing signals may be designed as a transmitting and receiving arrangement or exclusively as a receiving arrangement, and has a baseband component and a radiofrequency component. The interface between the baseband component and the radiofrequency component for the reception path is realized by an exclusively digital interface in the same way as the interface for the transmission path. The transmission of useful data—received useful data, useful data to be transmitted—is preferably effected via the digital interface completely separately from the transmission of the configuration data.

9 Claims, 2 Drawing Sheets

U.S. PATENT DOCUMENTS

2002/0142741 A1* 10/2002 Molnar et al. .............. 455/127
2002/0193140 A1 12/2002 Behrens et al.
2003/0021262 A1* 1/2003 Ma et al. .................... 370/352
2004/0204096 A1* 10/2004 Hirsch et al. ............... 455/561

FOREIGN PATENT DOCUMENTS

| DE | 101 22 196 A1 | 12/2002 |
|---|---|---|
| WO | WO 02/075947 A1 | 9/2002 |
| WO | WO 02/091601 A2 | 11/2002 |

OTHER PUBLICATIONS

"Wireless Solutions Using Signia Technologies 2.4 GHz RF Transceiver Chips", Product Information of Signia Technologies Inc., Oct. 2002, pp. 1-23.
TRF6001 RF Transceiver for Bluetooth™, Product Information of Texas Instruments, 2001, 1 pg.
"W7020 Bluetooth Radio Module", Product Information of Lucent Technologies, Bell Labs Innovations, Microelectronics Group, Dec. 1999, 2 pgs.
"Signia Technologies Announces Low Cost 2.4 GHz Radio IC", from Business Wire, Milpitas, CA, Dec. 9, 2002, 2 pgs.
"Low-Cost RF Transceiver IC Offers Bluetooth Alternative", Mark Long, in Electronic Business, Electronic News Today, Your World in Real Time, Dec. 9, 2002, 2 pgs.
"TI Commits to $5 Bluetooth Chip Set", *Leading Edge*, by Nicholas Cravotta, Oct. 26, 2000, 2 pgs.
"TI-Dallas, Connected", vol. 4, No. 3, Apr. 3, 2001, pp. 1-12.
Texas Instruments, "Building Broadband", Cable DSL Wireless, advertising brochure of Texas Instruments, vol. 1, May 7, 2001, 2 pgs.
"TRF6001 RF Transceiver for Bluetooth™ From Texas Instruments", Excerpt of LS System Infoserver, 2001, 2 pgs.
"Lucent Technologies Unveils Module and Software for Bluetooth", in TechOnLine, Dec. 16, 1999, 2 pgs.
"Lucent Technologies Unveils Wireless Solution For Bluetooth Applications", in EDP Weekly's IT Monitor, Dec. 20, 1999, 2 pgs.
International Search Report, Int'l Application No. PCT/DE2004/000041, Int'l Filing Date Jan. 15, 2004, 3 pgs.

* cited by examiner

DEVICE FOR PROCESSING SIGNALS IN A MOBILE STATION

REFERENCE TO RELATED APPLICATIONS

This application is a continuation of PCT/DE2004/000041, filed on Jan. 15, 2004, which was not published in English, which claims the benefit of the priority date of German Patent Application No. DE 103 01 303.2, filed on Jan. 15, 2003.

FIELD OF THE INVENTION

The present invention relates to a device for processing signals, in particular for processing signals in a mobile station. In mobile radio, a distinction is usually made between mobile stations and base stations, it being possible for a plurality of mobile stations to communicate simultaneously with one base station or one fixed station.

BACKGROUND OF THE INVENTION

Modulators and demodulators in mobile stations are used within transmitting and receiving devices in mobile stations; they modulate and demodulate a carrier oscillation and received data according to the data to be transmitted and according to the received data in accordance with standardized modulation and demodulation methods. Examples of known modulation and demodulation methods are GSM (Global System for Mobile Communication), EDGE (Enhanced Data Rates for GSM Evolution), TIA-EIA 136 (Telecommunication Industry Associations/Electronic Industry Association), UTRA FDD (UMTS-Terrestrial Radio Access Frequency Division Duplex) UTRA TDD (UMTS-Terrestrial Radio Access Time Division Duplex and IS-95. In general, these modulators and demodulators comprise a plurality of functional units, for example, a baseband component, which generates a standard-conforming, usually complex-value signal from the data to be transmitted with the aid of digital signal processing, and a radio frequency component, which shifts said complex-value signal into a radio frequency and transmits it as a real-value signal after suitable amplification via an antenna. Correspondingly, the received useful data are demodulated into a complex-value signal by the radiofrequency component, and the received demodulated data are processed further in a baseband component. The data are transmitted via a radio channel in each case.

On account of different physical requirements made of the baseband and radiofrequency components, these functional units are usually realized in separate integrated circuits with different production technologies. In the transmitting direction, the modulated baseband signal then has to be transferred in a suitable form to the radiofrequency component. In the receiving direction, the demodulated radiofrequency signal has to be transferred in a suitable form to the baseband signal. In this case, a suitable interface has to be provided between the baseband component and the radiofrequency component, which interface is currently usually realized in the form of an analog signal interface. In this case, the baseband signals are usually provided at said analog interface as complex-value baseband signals which are decomposed into a real part and an imaginary part, as a so-called IQ signal with an inphase component and a quadrature component phase-shifted by 90° with respect thereto. In this case, I and Q components are usually transmitted in each case as a differential signal, so that once again two lines in each case have to be provided.

The published German patent application DE 100 35 116 A1 discloses a radiofrequency interface for dual standard baseband chips in mobile radio apparatuses. In the signal bus system for transmitting reception signals and transmitting signals from the radiofrequency side to the baseband side and vice versa, the interface is an all analog design. Besides the disadvantage of the all analog design of the interface, the high number of signal connections required between the radiofrequency side and the baseband side is also a significant disadvantage, particularly with regard to the resultant relatively low flexibility of the arrangement and the relatively large space requirement. Moreover, it is necessary to use relatively high-quality analog signal processing components, such as, e.g., digital/analog and analog/digital converters, in the baseband module and in the radiofrequency module, respectively.

Furthermore, in the baseband circuit part, it is usually necessary to perform particular signal processing steps with regard to the radiofrequency component, in order to compensate for in advance, or to correct in advance, inadequacies, non-idealities or tolerances in the radiofrequency component. Consequently, the baseband part can no longer be considered, analyzed and developed independently of the radiofrequency part. On account of this progressive development in the field of digital signal processing and the modulator concepts, the proportion of processing in baseband in relation to the overall signal processing path is increasing more and more, especially with regard to the interaction with the radiofrequency part. This results in an undesirable restricted flexibility of baseband modules or baseband chips since the baseband modules can only be used together with that radiofrequency assembly for which they have been specifically developed.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present one or more concepts of the invention in a simplified form as a prelude to the more detailed description that is presented later.

The invention is directed to a device for processing signals, in particular for mobile radio, which enables a baseband processing independent of the radiofrequency part and can be realized with a low outlay, in particular a small number of pins.

A device according to the invention for processing signals, in particular for mobile radio, has a baseband component for processing a reception signal having an input/output designed for digital data transmission. Furthermore, the device comprises a radiofrequency component for converting the reception signal into a baseband signal, the radiofrequency component having an input/output that is designed for digital data transmission and is electrically connected to the input/output of the baseband component for the digital transmission of useful data to be received. The useful data to be received are to be understood as those data with which a carrier frequency is modulated in the radiofrequency part.

The device according to the invention can be realized with a small number of lines. Furthermore, the digitally-realized interface between the baseband component and the radiofrequency component enables a transmission of received useful data from the radiofrequency part to the baseband part, and also the transmission of configuration data. The digital interface between the baseband component and the radiofrequency component can be realized in such a way that the digital interface has a lowest possible data rate. A particular advantage of the device according to the invention is evident from the fact that the digital interface between baseband component and radiofrequency component enables a baseband processing that is independent of the radiofrequency part. The baseband component is realized entirely with digital circuit components, with the result that a high integration density is made possible and extensive independence from manufacturing variations can be achieved. The interface between baseband component and radiofrequency component can thereby be formed completely without analog components. It is ensured that, on the one hand, the communication of modulation data and of configuration data from the baseband part to the radiofrequency part, and on the other hand, the communication of reception data from the radiofrequency part to the baseband part can be effected digitally.

Furthermore, the device according to the invention makes it possible to perform those signal processing steps at the physical level which correspond to layer 1 in the OSI layer model such as, for example, modulation, precorrection and compensation and also pulse shaping with digital interfaces described, completely in the radiofrequency component and accordingly independently of the baseband component. It can also be ensured that signal processing steps at the information bit level are carried out in the baseband component, such as, for example, the formation of transport blocks, channel coding such as for example, convolutional and/or turbocoding, adaptation of the bit rate, error protection coding, interleaving, frame and packet segmentation and also transport stream multiplexing.

The device for processing signals enables a substantially simplified circuit layout and also a substantially simplified circuit design in the baseband component and in the radiofrequency component. The digital interface permits real-time operation and exhibits a substantially higher flexibility by virtue of the fact that those digital signal processing steps for compensation and/or precorrection of the radiofrequency signals can be carried out directly in the radiofrequency assembly, i.e. in the radiofrequency component. This enables a baseband component to be coupled to different radiofrequency components depending on the application. A further advantage is to be seen in the fact that an adaptation to future manufacturing processes and manufacturing technologies with higher integration densities can be realized with a very low outlay. In this case, the radiofrequency component and the baseband component may be integrated circuits that are separate from one another. The device according to the invention is formed in such a way that it is, in one example, designed for use in mobile radio stations that support one or more of the mobile radio standards GSM, EDGE, TIA/EIA-136, UTRA FDD, UTRA TDD or IS-95. The device can thus be designed in an embodiment as a receiving arrangement for processing, in particular, reception signals in mobile stations.

In an advantageous exemplary embodiment, the device has a first digital multiconductor connection for transmitting the received useful data from the radiofrequency component to the baseband component. Furthermore, the device advantageously comprises a second digital multiconductor connection for transmitting configuration data from the baseband component to the radio frequency component, the first and the second digital multiconductor connection being connected to the input/output of the radiofrequency component and the input/output of the baseband component. The term configuration data denotes the data with which the radiofrequency component can be configured. By way of example, this is the type of modulation in the transmitter, the transmission power profile, the transmission instant, the amplitude, the transmission operating mode, the switch-on and switch-off behavior of the transmitter, the transmission duration, etc.

The two independent digital multiconductor connections make it possible to carry out a separate transmission of useful data and configuration data. Since, in general, the useful information is processed by a digital signal processor in the baseband component and the configuration information is provided by a microprocessor in the baseband component independently thereof, the received useful data can be transmitted via the separate first digital multiconductor connection from the radiofrequency component to the baseband component. In an advantageous manner, the received useful data and the configuration data are transmitted separately via the digital interface by means of message-oriented or packet-oriented transmission protocols. The first and second digital multiconductor connections may be electrically connected to the radiofrequency component via a single input/output. However, it may also be provided that the first digital multiconductor connection is connected to a first input/output of the radiofrequency component, and the second digital multiconductor connection is connected to a second input/output of the radiofrequency component. It may analogously be provided that the first and second digital multiconductor connections are connected to a single input/output of the baseband component or to in each case a separate input/output of the baseband component.

In one example, the first digital multiconductor connection comprises at least one data line designed for the serial transmission of the received useful data. In addition, the first digital multiconductor connection has a bit clock line designed for the transmission of a clock signal, a respective clock period being assigned to a respective bit of the data line. Furthermore, the first digital multiconductor connection comprises a word clock line designed for indicating the beginning of communication of a sequence of bits on the data line. The data to be transmitted via the data line, in particular the received useful data, may be constructed in transmission units (messages) which in each case comprise 16 bits arranged serially, by way of example. A signal pulse (burst) of the circuit may itself in turn comprise, for example, in the case of the GSM radio standard, a sequence of a total of 11 messages each having a length of 16 bits.

In an advantageous manner, the device for processing signals has a second digital multiconductor connection comprising a data line designed for the serial transmission of the configuration data. Moreover, the second digital multiconductor connection has a bit clock line designed for the transmission of a clock signal, a respective clock period being assigned to a respective bit of this data line. Furthermore, the second digital multiconductor connection comprises a word clock line designed for indicating the beginning of communication of a sequence of bits on the data line of the second digital multiconductor connection. This enables not only the received useful data but also the configuration data to be transmitted via a digital interface constructed from three signal lines. In the case of the configuration data, too, the transmission protocol is advantageously organized in messages. In the organization of the transmission protocols, it is possible to use individual messages or else a combination of messages directly succeeding one another. Since, in the case of the device according to the invention, the useful data transmission can be carried out completely independently of the data transmission of the configuration data, it is also possible for, by way of example, a microprocessor in the baseband component to transmit the signal parameters to the radiofrequency component at specific instants, the instants being predetermined by the microprocessor. In this case, it can be ensured that the digital signal processor in the baseband component remains uninfluenced and there is no need to carry out a useful data transmission or processing interruption. As a result, it is possible to achieve a substantial simplification of the temporal sequence and of the coordination of the operations in the baseband component.

In one exemplary embodiment, the inputs/outputs of the baseband component and the radiofrequency component are designed for a bidirectional data transmission. In this example the device is designed as a receiving and transmitting arrangement, the baseband component additionally being designed for processing a baseband signal. Furthermore, the radiofrequency component additionally being designed for converting the baseband signal into a radiofrequency transmission signal. What can thereby be achieved is that the interface of the reception path is realized by a digital interface and also the interface of the transmission path is formed as a digital interface. Therefore, both the received useful data and the useful data to be transmitted are transmitted via digital interfaces between the baseband component and the radiofrequency component. By virtue of both the transmitting arrangement and the receiving arrangement having digital interfaces, the device can be constructed with a reduced number of lines and increased flexibility and also a lower outlay for realization.

In a particularly advantageous manner, the first and second multiconductor connections are designed for a bidirectional signal transmission. It is advantageous for the data line of the first multiconductor connection to be of bidirectional design, this making it possible for a serial transmission of useful data to be transmitted to be made possible via the data line. Useful data to be transmitted are to be understood as those data with which a carrier frequency is modulated in the radiofrequency component and transmitted via an antenna. It may furthermore be provided that the data line of the second multiconductor connection is of bidirectional design, thereby making it possible for a serial transmission of configuration data additionally to be made possible. The bidirectional embodiment of the data line of the first multiconductor connection makes it possible to transmit both reception data from the radiofrequency component to the baseband component and transmission data from the baseband component to the radiofrequency component. It may also be provided that the first multiconductor connection has two data lines, only the transmission data being transmitted via one of the data lines and only the reception data being transmitted via the second data line.

Furthermore, the bidirectional embodiment of the data line of the second multiconductor connection enables configuration data to be transmitted both from the radiofrequency component to the baseband component and from the baseband component to the radiofrequency component. This results in a substantially higher flexibility and a larger and extended area of use both of the baseband component and of the radiofrequency component. By virtue of the fact that the reception data, upon reception, are immediately transmitted from the radiofrequency component via the data line of the first multiconductor connection to the baseband component, the result is a reduced data storage requirement in the radiofrequency component since transmission and reception data can be buffer-stored in the baseband component. This again results in a higher flexibility in the choice of technology of the radiofrequency component. Since, furthermore, analog components are no longer required for transmission and reception paths in the baseband component, the baseband component can be realized by means of simpler, more cost-effective production technologies for exclusively digital circuits. The device according to the invention for processing signals may thus be designed on the one hand as a receiving arrangement with a digital interface of the reception path. In an advantageous manner, the device may also be designed as a transmitting and receiving arrangement in which the transmission path and the reception path are realized by means of a digital interface.

In a particularly advantageous manner, for the transmission path and also for the reception path, there are provided in each case precisely one line for the received useful data and also for the useful data to be transmitted in the form of the data line of the first multiconductor connection. It may likewise preferably be provided that provision is made of precisely one line for the configuration data, which is realized by the data line of the second multiconductor connection. As a result, it is possible to considerably reduce the number of signal lines, in particular data lines, between the baseband component and the radiofrequency component.

Furthermore, the device advantageously has a synchronization line for synchronizing the useful data in the radiofrequency component. The synchronization line is electrically connected to the inputs/outputs of the radiofrequency component and the input/output of the baseband component. Furthermore, it may be provided that the device comprises a digital signal line for interrupting or initiating a signal transmission between the radiofrequency component and the baseband component. This additional digital signal line is electrically connected to the input/output of the radiofrequency component and the input/output of the baseband component. The synchronization line can transmit synchronization information defining the instant of the respective beginning and end of transmission on the output side at the radiofrequency component. By way of example, it is thereby possible to carry out a synchronization with the time slots of a radio standard taken as a basis. The additional digital signal line for interrupting or initiating a signal transmission may be used for example to instigate the resumption or interruption of the data transmission between the baseband component and the radiofrequency component.

Preferably, the inputs and outputs of the radiofrequency component and of the baseband component are designed for a serial data transmission. A serial data transmission, in particular a serial digital data transmission, may enable the use of digital transmission methods with standardized transmission protocols on account of the small volume of data to be transmitted.

It may also be provided that the word clock lines identify the beginning of a new word, in particular a 16-bit word, by means of an edge change in the clock signal, in particular an edge change from a low level to a high level. It may furthermore be provided that, for at least one signal connection between the radiofrequency component and the baseband component, and in particular for the data line of the first multiconductor connection, an edge shaping method or a pulse shaping method is used for the purpose of reducing interference emissions.

It proves to be particularly advantageous if at least one signal connection between the baseband component and the radiofrequency component is designed as a differential signal line or as a double line. In particular, it is advantageous for the data line of the first digital multiconductor connection that is designed for the serial transmission of the useful data to be designed as a differential signal line.

It is furthermore advantageous if a signal edge or signal pulse shaping method is used for at least one signal connection between the baseband component and the radiofrequency component, in particular for the data line of the first digital multiconductor connection.

In an advantageous exemplary embodiment, the device according to the invention is arranged in a mobile station, the mobile station being designed for communication, in particular for wire-free transmission of signals, with a base station. In this case, too, the device according to the invention in the mobile station may be designed as a transmitting and receiving arrangement or just as a receiving arrangement.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

An exemplary embodiment of the invention is explained in more detail below with reference to schematic drawings, in which.

DETAILED DESCRIPTION OF THE INVENTION

Figure 1:
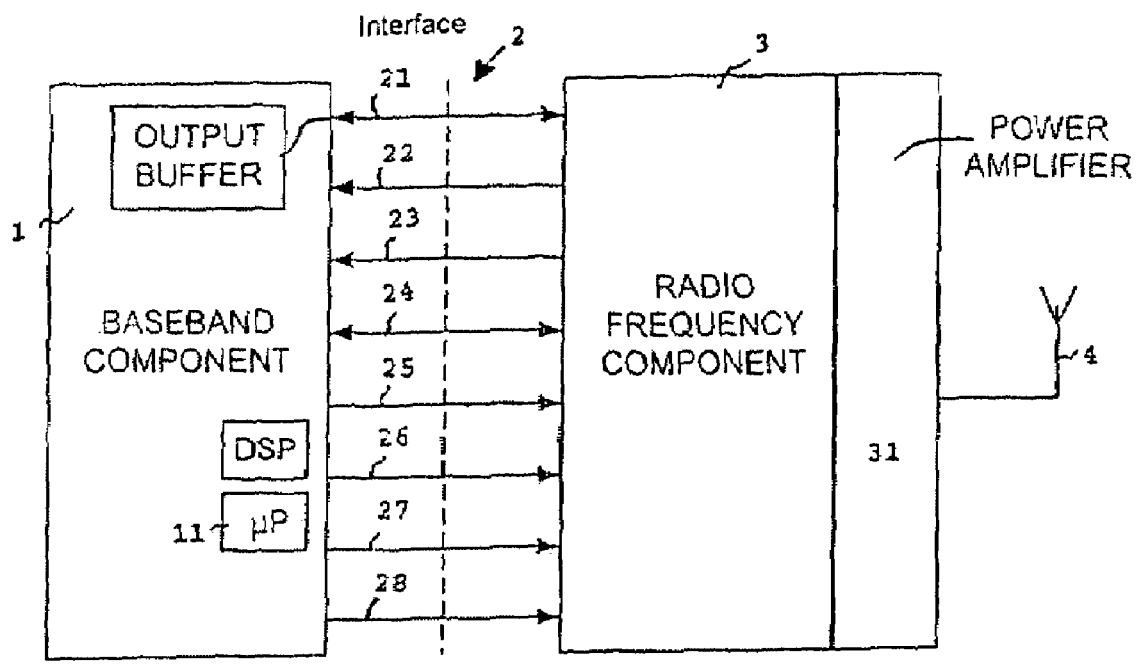
FIG. 1 is a block diagram illustrating a first embodiment of the device according to the invention.

A device according to the invention for processing signals for mobile radio (FIG. 1) has a baseband component 1. The baseband component 1 is connected to a radiofrequency component 3 via a digital interface 2. The baseband component 1 performs the digital processing of useful data to be transmitted and of received useful data and comprises a digital signal processor DSP for processing the useful data and also a microprocessor 11 for controlling the radiofrequency component 3 by means of the configuration data. Furthermore, the microprocessor 11 controls the sequence control. The radiofrequency component 3 comprises a power amplifier 31 in the present exemplary embodiment.

The power amplifier may also be realized as an external component and be separate from the radiofrequency component 3. An antenna 4 is connected to the power amplifier 31 on the output side, and is designed for transmission of radiofrequency modulated signals. In the exemplary embodiment illustrated, the device is embodied as a transmitting and receiving arrangement in a mobile station. The digital interface 2 between the baseband component 1 and the radiofrequency component 3 comprises a first digital multiconductor connection designed for the transmission of useful data to be transmitted and of received useful data between the baseband component 1 and the radiofrequency component 3. Said first digital multiconductor connection comprises a data line 21 designed for a bidirectional transmission of signals. The useful data to be transmitted and the received useful data are transmitted via said data line 21. Consequently, the useful data are transmitted via just a single data line. However, it may also be provided that the useful data to be transmitted are transmitted via a first data line and the received useful data are transmitted via a second data line of said first digital multiconductor connection. The data line 21 may also be designed as a differential signal line.

Furthermore, the first digital multiconductor connection comprises a bit clock line 22, designed for the transmission of a clock signal, a respective clock period being assigned to a respective bit of the data line 21. A word clock line 23, which is likewise assigned to the first digital multiconductor connection, is designed for indicating the beginning of communication of a sequence of bits on the data line 21. Consequently, in the exemplary embodiment, the first digital multiconductor connection is realized as a three-conductor connection between the baseband component 1 and the radiofrequency component 3.

Furthermore, the transmitting and receiving arrangement comprises a second digital multiconductor connection, which has a data line 24 designed as a bidirectional data line 24 in the exemplary embodiment. Via the bidirectional data line 24, configuration data are transmitted from the baseband component 1 to the radiofrequency component 3. Via said bidirectional data line 24, data can also be transmitted from the radiofrequency component 3 to the baseband component 1, which data have been requested, by way of example, beforehand, by means of a special request message from the baseband component 1. This special request message may for example be characterized in that a bit in the address part serves for indicating that reading access, rather than writing access to the address is intended to be effected. The second digital multiconductor connection likewise comprises a bit clock line 25 designed for the transmission of a clock signal, a respective clock period being assigned to a respective bit of the data line 24 in this case, too. The second digital multiconductor connection furthermore comprises a word clock line 26 designed for indicating the beginning of communication of a sequence of bits on the data line 24.

In the exemplary embodiment, the transmitting and receiving arrangement may have a synchronization line 27, which is used to define the beginning and end of transmission time slots in a transmission signal. A digital signal line 28 is used to start or interrupt a signal transmission between the radiofrequency component 3 and the baseband component 1. By means of said digital signal line 28, the radiofrequency component 3 is put into a position to cause the baseband component 1 to effect a new action, in particular to effect further transmission of data. In the embodiment of the invention that is illustrated in FIG. 1, the baseband component 1 is thus designed for processing a reception signal and also for processing a baseband signal. Equally the radiofrequency component 3 is designed for converting the reception signal into a baseband signal and for converting a baseband signal into a radiofrequency transmission signal. The interface of the transmission path and of the reception path is of all digital design and both the first and the second multiconductor connection are designed for bidirectional signal transmission.

The bit clock line 22 and the word clock line 23 of the first digital multiconductor connection are designed for the signal transmission from the radiofrequency component 3 to the baseband component 1. The bit clock line 25 and the word clock line 26 of the second digital multiconductor connection are designed for signal transmission from the baseband component 1 to the radiofrequency component 3. The synchronization line 27 and also the digital signal line 28 are designed in one example as unidirectional data lines and are designed for signal transmission from the baseband component 1 to the radiofrequency component.

On account of the all digital embodiment of the interface 2, the baseband component 1 may advantageously be realized completely using digital circuit technology. Moreover, the complete separation of the respectively digital useful data transmission from the configuration data transmission permits a considerably simplified construction of the baseband component 1. This is made possible by the fact that data provided by the digital signal processor DSP and data provided by the microprocessor 11 are not coupled. Furthermore, the hybrid, i.e. partly analog and partly digital, circuit technology that is customary in the baseband component is obviated in the reception path and in the transmission path. By virtue of the fact that the first and second digital multiconductor connections in each case have only one data line 21 and 24 and the entire device has only one synchronization line 27 and one digital signal line 28 for interrupting or initiating a signal transmission, the device can be realized with a minimized number of pins for the chips involved.

Figure 2:
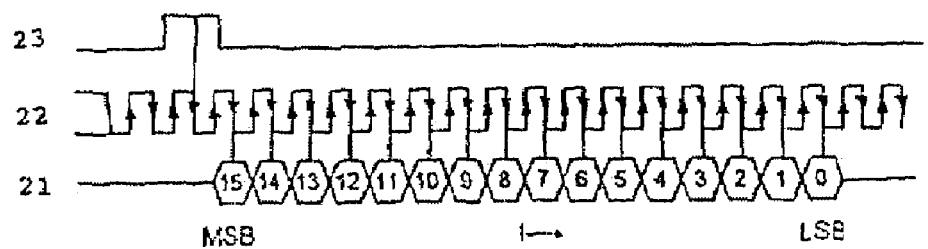
FIG. 2 is a timing diagram illustrating an exemplary signal profile illustration of the first digital multiconductor connection for the transmission of the useful data via the digital interface in accordance with FIG. 1.

FIG. 2 illustrates an exemplary illustration of signal profiles of the data line 21, of the bit clock line 22 and of the word clock line 23 of the first digital multiconductor connection. In this case, the serial transmission of the data—received useful data, useful data to be transmitted—via the data line 21 is effected in a manner organized in messages, a message comprising 16 bits arranged serially in the present exemplary embodiment. In this case, the most significant bit (MSB) is transmitted first and the least significant bit (LSB) is transmitted last. In the present exemplary embodiment, the most significant bit serves for identifying whether the 15 less significant bits contain useful information. It is thus identified whether modulation bits for modulating a carrier oscillation in the radiofrequency component 3 or supervisory information, that is to say data for controlling the serial transmission or the type of serial transmission and the transport format of the useful data, are involved, that is to say ultimately whether modulation bits for Gaussian minimum shift keying, EDGE or other types of modulation are involved.

In each case, with a falling clock edge of the periodic clock signal of the bit clock line 22, of the so-called bit clock, a respective modulation bit of the data line 21 is clocked into the radiofrequency component 3. The word clock signal of the word clock line 23 defines the beginning of the transmission of a message in that a falling clock edge is effected in the bit clock at the same time as a word clock pulse. The data transmission then begins with the subsequent falling clock edge of the bit clock. Both the received useful data and the useful data to be transmitted are transmitted from the radiofrequency component 3 to the baseband component 1 or from the baseband component 1 to the radiofrequency component 3 in accordance with the scheme illustrated in FIG. 2.

Figure 3:
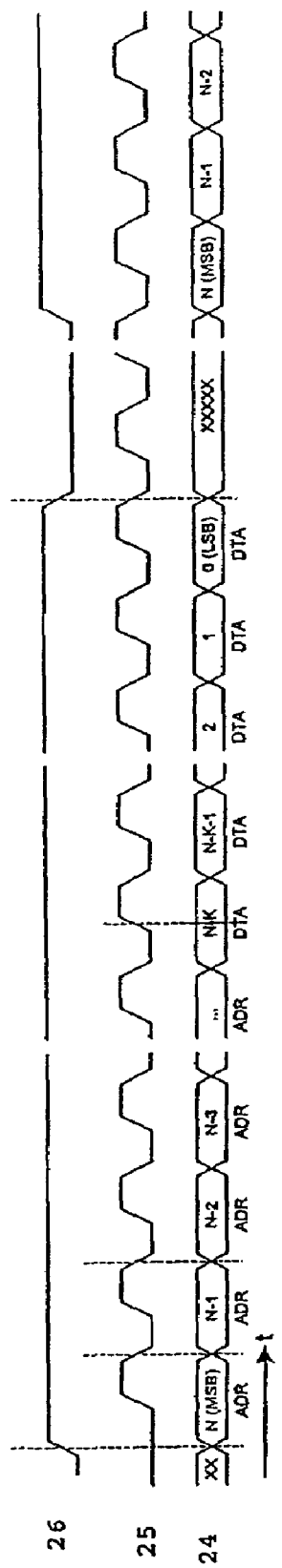
FIG. 3 is a timing diagram illustrating an exemplary signal profile illustration of the second digital multiconductor connection for the transmission of the configuration data via the digital interface in accordance with FIG. 1.

FIG. 3 illustrates a temporal profile of the signals of the data line 24, of the bit clock line 25 and of the word clock line 26 of the second digital multiconductor connection. The second digital multiconductor connection is also designed for serial data transmission via the bidirectional data line 24. The word clock line 26 is used to carry out a module selection by means of which the configuration-data-receiving radiofrequency component 3 or a sub-circuit thereof can be activated. The transmission protocol of the configuration data via the data line 24 is also effected in a message-organized manner, in which case the messages may be either individual messages or a combination of directly successive messages. In this case, a message comprises a defined number of N+1 bits, for example 24 bits, and is composed of an address part and a data part. In this case, the address part comprises K bits and is designated by ADR, while the data part is designated by DTA and comprises N−K+1 bits.

In the case of a message combination which transmits data to successive addresses, the address part may be omitted if the start address is known to the receiver. The address then determines the destination location, for example a function block to which the data are to be transmitted in the radiofrequency component 3. For the transmission of a message combination, it is possible to use a special configuration message which, before the beginning of a message combination, defines the beginning, the length and the start/destination address of the combination. A message combination serves for example for setting the basic configuration of the transmission arrangement in a time-efficient manner. In the transmission of individual messages, the instant of message transmission generally also determines the instant of activation of the new setting or the configuration of the transmitting and receiving arrangement. Via the bidirectional data line 24, it is also possible to transmit data from the radiofrequency component 3 to the baseband component 1 which have been requested beforehand by means of a special request message from the baseband component 1. Said request message may be designed for example in such a way that a bit in the address part serves for indicating reading access, rather than writing access, to the address.

As can be discerned from FIGS. 2 and 3 when considered together with the block diagram in FIG. 1, the microprocessor 11, at instants defined by it, can transmit transmission parameters to the radiofrequency component 3 independently of a useful data transmission without the digital signal processor DSP thereby being influenced or the latter's processing or transmission of useful data even having to be interrupted. This results in a substantial simplification of the temporal sequence and also of the sequence control in the baseband component 1.

Figure 4:
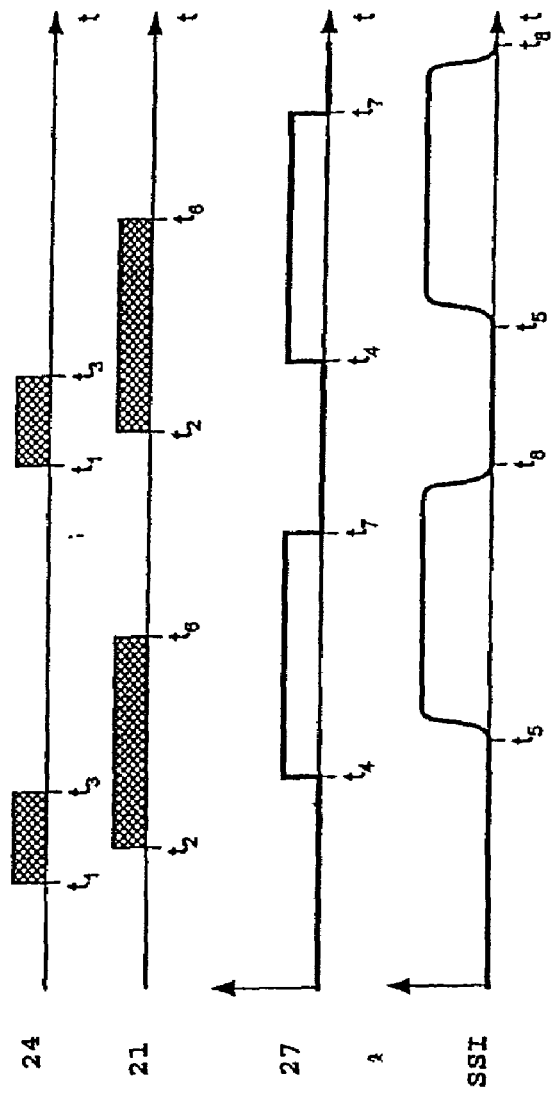
FIG. 4 is a timing diagram illustrating an illustration of the signal profiles for the transmission of configuration data, useful data, synchronization data and also a basic profile of a transmission power via the digital interface in accordance with FIG. 1.

FIG. 4 illustrates the relationship between the transmission of useful data, configuration data and synchronization data and also the basic profile of the transmission power of a GSM-conforming transmission signal from FIG. 1. In this case, the useful data to be transmitted or the received useful data are transmitted via the first digital multiconductor connection (data line 21, bit clock line 22 and word clock line 23). The configuration data are transmitted via the second digital multiconductor connection (data line 24, bit clock line 25 and word clock line 26). The synchronization information is transmitted via the synchronization line 27. Firstly, the radiofrequency component 3 is activated via the digital signal line 28 (FIG. 1) and all configuration data required for the transmission are transmitted to the radiofrequency component 3 via the data line 24 of the second digital multiconductor connection. Once a sufficient number of modulation bits have been written to the output buffer of the baseband component 1, a start signal can be passed to the radiofrequency component 3 via the synchronization line 27 in order to request the modulation data from the baseband component 1 and to start the modulation and the transmission. A rising edge identifies the beginning of transmission, for example, and a falling edge identifies an end of a transmission time slot (burst). In the time sequences of signals as illustrated in FIG. 4, the instant $t_1$ identifies the beginning of the transmission of configuration data and the instant $t_3$ identifies the end of the transmission of said configuration data. The instant $t_2$ designates the beginning of the transmission of useful information (received useful data or useful data to be transmitted), and the instant $t_6$ identifies the end of the transmission of said useful information. In the signal profile of the synchronization line 27, the instant $t_4$ designates the start of the modulator and the instant $t_7$ designates the initiation of an end of the transmission pulse. Furthermore, the signal profile of the transmission signal SSI depicts the instant $t_5$, which characterizes the beginning of an upward power ramp, and an instant $t_8$, which identifies the end of a downward power ramp. In a corresponding manner, the reception signals of the reception path are also processed by the components illustrated in FIG. 1 and may proceed temporally in accordance with the signal profiles in FIG. 4.

The device according to the invention may be designed as a receiving arrangement or as a transmitting and receiving arrangement. What is essential is that, in the case where a receiving arrangement is present, the interface of the reception path is embodied digitally. If the device is designed as a transmitting and receiving arrangement, both the interface of the transmission path and the interface of the reception path are designed digitally. In this case, the first and second multiconductor connections are advantageously designed for bidirectional data transmission. The useful data to be transmitted and the received useful data are transmitted by the bidirectional data line of the first digital multiconductor connection between the baseband component 1 and the radiofrequency component 3. The configuration data are transmitted via the bidirectional data line 24 of the second digital multiconductor connection in the same way.

While the invention has been illustrated and described with respect to one or more implementations, alterations and/or modifications may be made to the illustrated examples without de-parting from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

The invention claimed is:

1. A receiving and transmitting arrangement for mobile radio, comprising:
    a baseband component having an output buffer associated therewith, the baseband component configured to process a reception signal or a transmission signal, and comprising an input/output configured for digital data transmission;
    a radiofrequency component configured to convert the reception signal into a baseband signal or convert a baseband signal into a transmission signal, and comprising an input/output configured for digital data transmission, and electrically coupled to the input/output of the baseband component for the digital transmission of useful data thereto or therefrom;
    a first digital multiconductor connection coupled between the input/outputs of the baseband component and the radiofrequency component, respectively, and configured to transmit the received useful data from the radiofrequency component to the baseband component and the useful data to be transmitted from the baseband component to the radiofrequency component;
    a second digital multiconductor connection coupled between the input/outputs of the baseband component and the radiofrequency component, respectively, and configured to transmit configuration data from the baseband component to the radio frequency component;
    a synchronization line configured to provide a unidirectional data transmission from the baseband component to the radiofrequency component; and
    a digital signal line configured to provide a unidirectional data transmission from the baseband component to the radiofrequency component,
    wherein during a transmission operation, the radiofrequency component is activated via a signal on the digital signal line and all the configuration data required for the transmission are transmitted to the radiofrequency component via the second multiconductor connection, and wherein as soon as a predetermined quantity of data bits have been written to the output buffer of the baseband component, a start signal is communicated to the radiofrequency component via the synchronization line in order to request the data bits from the output buffer of the baseband component for transfer via the first multiconductor connection to the radiofrequency component for additional processing thereof.

2. The arrangement of claim 1, the first digital multiconductor connection further comprising:
    at least one data line configured for serial transmission of the received useful data;
    a bit clock line configured for transmission of a clock signal, wherein a respective clock period thereof is assigned to a respective bit of the data line; and
    a word clock line configured to indicate a beginning of communication of a sequence of bits on the data line.

3. The arrangement of claim 1, the second digital multiconductor connection further comprising:
    at least one data line configured for the serial transmission of the configuration data;
    a bit clock line configured for the transmission of a clock signal, wherein a respective clock period thereof is assigned to a respective bit of the data line; and a word clock line configured to indicate a beginning of communication of a sequence of bits on the data line.

4. The arrangement of claim 1, wherein the inputs/outputs of the baseband component and the radiofrequency component are configured for a bidirectional data transmission.

5. The arrangement of claim 1, wherein the first and second multiconductor connections are configured for a bidirectional signal transmission.

6. The arrangement of claim 2, wherein the data line of the first multiconductor connection is bidirectional, and is additionally configured for the serial transmission of useful data to be transmitted, and the data line of the second multiconductor connection is bidirectional, and is additionally configured for the serial transmission of configuration data.

7. The arrangement of claim 2, wherein the data line of the first digital multiconductor connection between the baseband component and the radiofrequency component is configured as a differential signal line.

8. The arrangement of claim 2, wherein the baseband component and the radiofrequency component are both configured to employ a signal edge or signal pulse shaping protocol for the data line of the first digital multiconductor connection between the baseband component and the radiofrequency component.

9. The arrangement of claim 1, wherein the baseband component and the radiofrequency component are configured together in a communication device configured for wireless transmission of signals with a base station.

* * * * *